United States Patent
Fahn et al.

(10) Patent No.: US 8,125,512 B2
(45) Date of Patent: Feb. 28, 2012

(54) SYSTEM AND METHOD FOR MOVING OBJECT SELECTION IN A HANDHELD IMAGE CAPTURE DEVICE

(75) Inventors: Paul Fahn, Sunnyvale, CA (US); Stefan Marti, San Francisco, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 1138 days.

(21) Appl. No.: 11/941,828

(22) Filed: Nov. 16, 2007

(65) Prior Publication Data

US 2009/0128618 A1    May 21, 2009

(51) Int. Cl.
*H04N 17/00* (2006.01)
(52) U.S. Cl. .......................................... 348/36
(58) Field of Classification Search .............. 348/36
See application file for complete search history.

(56) References Cited

U.S. PATENT DOCUMENTS

| | | |
|---|---|---|
| 5,631,697 A | 5/1997 | Nishimura et al. |
| 6,005,610 A | 12/1999 | Pingali |
| 6,661,907 B2 | 12/2003 | Ho et al. |
| 6,795,794 B2 | 9/2004 | Anastasio et al. |
| 6,892,575 B2 | 5/2005 | Nasiri et al. |
| 7,103,218 B2 | 9/2006 | Chen et al. |
| 2007/0174272 A1* | 7/2007 | Carter et al. ............. 707/5 |
| 2009/0109795 A1 | 4/2009 | Marti |

OTHER PUBLICATIONS http://www.advancedimagingpro.com/—printed Oct. 24, 2008.
http://www.axis.com/—printed Oct. 24, 2008.
http://www.emagsys.com/—printed Oct. 24, 2008.
http://www.invensense.com—printed Oct. 24, 2008.
http://www.perceptivuc.com—printed Oct. 24, 2008.

* cited by examiner

*Primary Examiner* — Robert B Harrell
(74) *Attorney, Agent, or Firm* — Bayer Law Group LLP (57) ABSTRACT

A system and method for automatically selecting an object from a field of view of a handheld image capture device. The system includes sensors configured to sense features of one or more objects in the field of view and a decision unit configured to automatically select one or more objects from the field of view based on the sensed features using a decision algorithm that is based on a decision structure, wherein the decision structure receives and prioritizes inputs from the sensors. The system may also optionally include an object movement detecting module configured to detect movement of objects, and a manual selection unit configured to provide user priorities; if included, the information from these elements may also be used by the decision unit to automatically select the object or objects.

21 Claims, 9 Drawing Sheets

SYSTEM AND METHOD FOR MOVING OBJECT SELECTION IN A HANDHELD IMAGE CAPTURE DEVICE

BACKGROUND OF THE INVENTION

1. Field of the Invention

The present invention relates to an image capture device, and in particular, to a handheld camera having a multiple-axis actuating mechanism for automatic image capture.

2. Description of the Related Technology

A handheld image capture system has an imager which is controlled to perform operations to obtain an image. A few traditional operations include: 1) manually centering the imager on an object of interest, 2) manually rotating the imager before the image capture in order to align the object with the sides of the image (and thereby avoiding the situation where the object appears rotated relative to the frame of the image), and 3) manually controlling the zoom in/out function before image capture so that the object fills the captured image to an appropriate size (e.g., not appearing too small or too large relative to the frame of the captured image).

SUMMARY OF CERTAIN INVENTIVE ASPECTS

The system, method, and devices of the invention each have several aspects, no single one of which is solely responsible for its desirable attributes. Without limiting the scope of this invention as expressed by the claims which follow, its more prominent features will now be discussed briefly.

In one embodiment, there is a system for automatically selecting an object from a field of view of a handheld image capture device, the system comprising a plurality of sensors configured to sense features of objects in the field of view; an object movement detection module configured to detect movement of objects in the field of view by detecting camera body movement, detecting actuated lens movement, calculating the motions of objects, subtracting the camera body movement and actuated lens movement from the motions of objects, and determining what objects are moving objects; a manual selection unit configured to provide user priorities; and a decision unit configured to receive information from the plurality of sensors, the object movement module and the manual selection unit and to automatically select one or more objects based on object size, object movement, object temperature and the priorities.

In another embodiment, there is a system for automatically selecting an object from a field of view of an image capture device, the system comprising a plurality of sensors configured to sense features of one or more objects in the field of view, and a decision unit configured to automatically select one or more objects of interest based on the sensed features using a decision algorithm that is based on a decision structure, wherein the decision structure receives and prioritizes inputs from the plurality of sensors.

In another embodiment, there is a method of automatically selecting an object of interest from a field of view of an image capture device, the method comprising receiving a captured image as input, sensing features objects in the captured image using a plurality of sensors, and automatically selecting one or more objects of interest based on the sensed features using a decision algorithm that is based on a decision structure, wherein the decision structure receives and prioritizes inputs from the plurality of sensors.

In another embodiment, there is a computer usable medium having computer readable program code embodied therein for automatically selecting an object of interest from a field of view of an image capture device, the computer readable code comprising instructions for receiving an image of the field of view from the image capture device, sensing features of one or more objects in the image, detecting movement of the one or more objects in the image, automatically selecting one or more objects of interest based on the sensed features and the detected movement, and outputting information about the selected one or more objects.

DETAILED DESCRIPTION OF CERTAIN INVENTIVE EMBODIMENTS

The following detailed description is directed to certain sample embodiments of the invention. However, the invention can be embodied in a multitude of different ways as defined and covered by the claims. In this description, reference is made to the drawings wherein like parts are designated with like numerals throughout.

The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

Embodiments that will be described include systems and methods of using image data and various sensor inputs in a handheld camera with a multiple-axis actuating mechanism for compensating various human-caused errors to obtain automatic image capture. Image data may include one or more of motion video, still images, or any other suitable type of visual data.

The following letters of the Greek alphabet are used in this application to identify angles:

"α" is the letter alpha.
"β" is the letter beta.
"γ" is the letter chi.
"δ" is the letter delta.
"ε" is the letter epsilon.

I. Imager with a Multiple-Axis Actuating Mechanism (MAAM)

Figure 1:
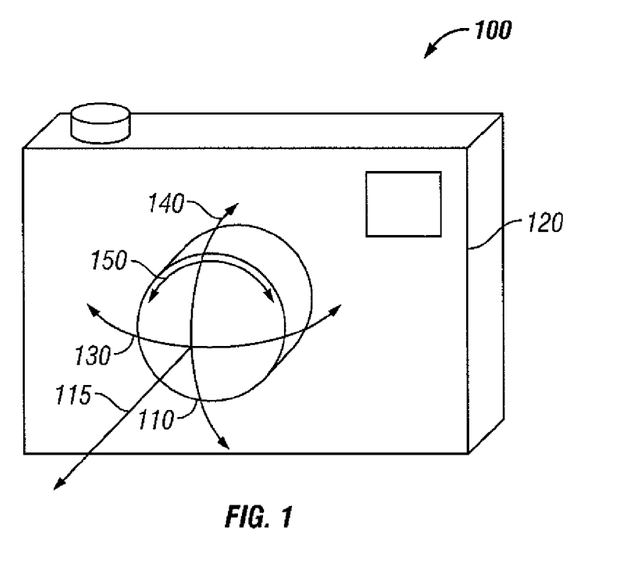
FIG. 1 is a diagram illustrating an embodiment of a handheld camera with a multiple-axis actuation mechanism (MAAM).

FIG. 1 shows an imager with a multiple-axis actuating mechanism (hereinafter "MAAM imager"). The MAAM imager shown in FIG. 1 is a single-imager handheld camera with a multiple-axis actuating mechanism (herein after a "single-imager MAAM camera"). The single-imager MAAM camera 100 includes a camera body 120 and an actuated imager 110. In certain embodiments, the imager comprises an image sensor and lens, wherein the lens is positioned proximately to the image sensor. The imager produces digitized electronic data based upon an image projected onto the image sensor by the lens. Alternatively, an imager comprises an imaging sensor, an object lens system placed on top of the image sensor, and circuitry for driving the imaging sensor and amplifying the electrical signals. The actuated imager is an imager such as described above that is given one or more degrees of freedom (DOF) due to the fact that it is connected to an actuating mechanism (single or multiple-axis). In some embodiments, the actuated imager 110 is configured to have three degrees of freedom (DOF) of motion including an auto-pan DOF 130 to automatically pan the imager left-right, an auto-tilt DOF 140 to automatically tilt the imager up-down and an auto-rotate DOF 150 to automatically rotate the imager clockwise-counterclockwise about its axis of symmetry 115. All three DOFs 130, 140, 150 are referenced with respect to the stationary camera body 120.

While FIG. 1 shows a handheld camera, the concept of an imager with a multiple-axis mechanism may be applied to various types of imagers including, but not limited to: 1) still photo cameras, 2) video cameras, 3) cell phone cameras, and 4) security and surveillance cameras mounted on autonomous, remote controlled, or manually driven mobile platforms, such as mobile robots, robotic surveillance systems, autonomous and non-autonomous vehicles. In some alternative embodiments, one of the DOFs 130, 140, 150 may be omitted. For example, the MAAM imager may have the auto-pan DOF 130 and the auto-rotate DOF 150, but not the auto-tilt DOF 140. In other alternative embodiments, the imager itself may not be actuated; instead, the same effect may be achieved by adjusting the optical axis of the imager using actuated optics components including prisms, mirrors, and other optics. For example, in order to minimize the mass that has to be moved by the actuator, it may not be necessary to move the whole imager (as shown in FIG. 1), but only a small mirror in front of it. Since the mass of the mirror is much smaller than the whole imager, the torque requirements for the actuators are much lower. However, both of these implementations share the same principle of shifting the optical axis of the imager in one or more dimensions.

Commercially available actuator technologies which can be used to implement the actuation of the imager itself or an optics component include, but are not limited to: 1) micro servos, 2) micro actuators, 3) galvanometer scanners, 4) ultrasonic motors, and 5) shape memory alloy (SMA) based actuators. These technologies, as well as electric and software control of the actuators, are described below:

1. Micro servos. This type of actuator is very common and widely used both (a) for remote controlled small consumer cars, airplanes, helicopters, and boats, and also (b) for robotics used by researchers. These actuators are mostly based on electric micro motors, but sometimes on magnetic coils.

Micro servos are integrated devices that come with motors, gears, and electronics, and the interfaces are standardized (either Pulse Width Modulation (PWM) signals, or digital protocols). In one embodiment, an example micro servo weighs in the 1 g range, measures 20×15×5 mm, and has output forces in the 150 g range (available for example from WES Technology Co., located in Germany). In one embodiment, an example magnetic actuator weighs in the 0.2 g range (e.g., HingeAct actuators by Plantraco Ltd., located in Saskatoon, Canada). The control electronics are modular, which allows use of a non-integrated controller or integrated electronics.

2. Micro actuators. Micro actuators are used in animatronics and robotic toys, e.g., MicroPets (actuators are used to move eyes and ears) and Aerosoarer (a tiny radio-controlled toy airplane with movable control surfaces) by TOMY (Japan). These actuators are mostly magnetic coil based. However, unlike micro servos, the electronics are not encapsulated with the motor, but integrated in the toy itself. These micro actuators are very cheap and optimized for weight minimization (in the sub-gram range).

3. Galvanometer scanners. This is an actuator which is used most often in laser projection systems for entertainment purposes. These scanners use deflecting magnetic coils to move a small mass (e.g., a mirror), and are optimized for ultra-low inertia scanning mirrors for highest possible speeds. This technology can be used to actuate a mirror (instead of the whole imager). The driver electronics and interfaces are mostly proprietary. One exemplary manufacturer of advanced galvanometers is Cambridge Technology (Lexington, Mass., USA).

4. Ultrasonic motors. Micro actuators based on piezo-ceramic technology are used in watches and other micro mechanical assemblies such as auto-focus motors in photo and video cameras (to move lenses for auto-focus and auto-zoom features). Unlike servos, ultrasonic motors do not come with standardized control interfaces, but instead have proprietary control interfaces. One exemplary manufacturer of commercially available ultrasonic motors for lens motors is Johnson Electric (headquartered in Hong Kong).

5. Shape Memory Alloy (SAM) based actuators. This type of actuator is based on alloys that change shape when heated, which is usually accomplished by applying a voltage. An example of a commercial actuator based on SMAs is Nano-Muscles (by NanoMuscle, Inc. of Antioch, Calif., USA), which comes with the control electronics. This actuator technology is advanced, but in a less mature stage than electro motor or magnetic coil based technologies. However, it can carry significant advantages over the more common actuator technologies.

6. Electric and software control of the actuators: In general, actuator vendors make available 1) electronic control circuitry and 2) a software API, to enable engineers to integrate the actuator into their systems.

Figure 2A:
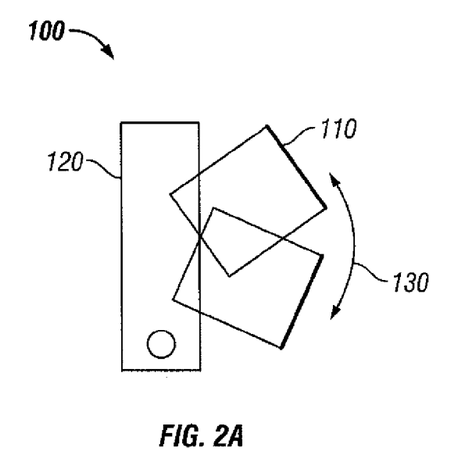
FIG. 2A is a top view diagram illustrating an example of an auto-pan degree of freedom (DOF) in a handheld camera with a multiple-axis actuation mechanism.
Figure 2B:
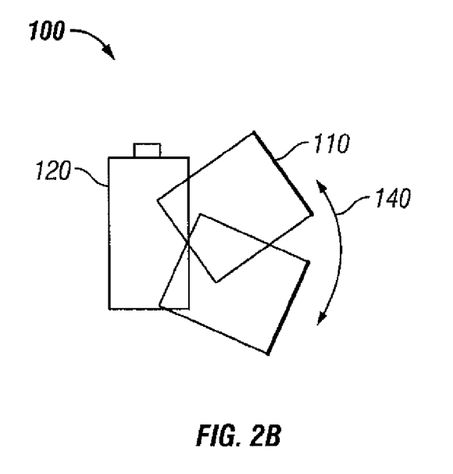
FIG. 2B is a side view diagram illustrating an example of an auto-tilt DOF in a handheld camera with a multiple-axis actuation mechanism.
Figure 2C:
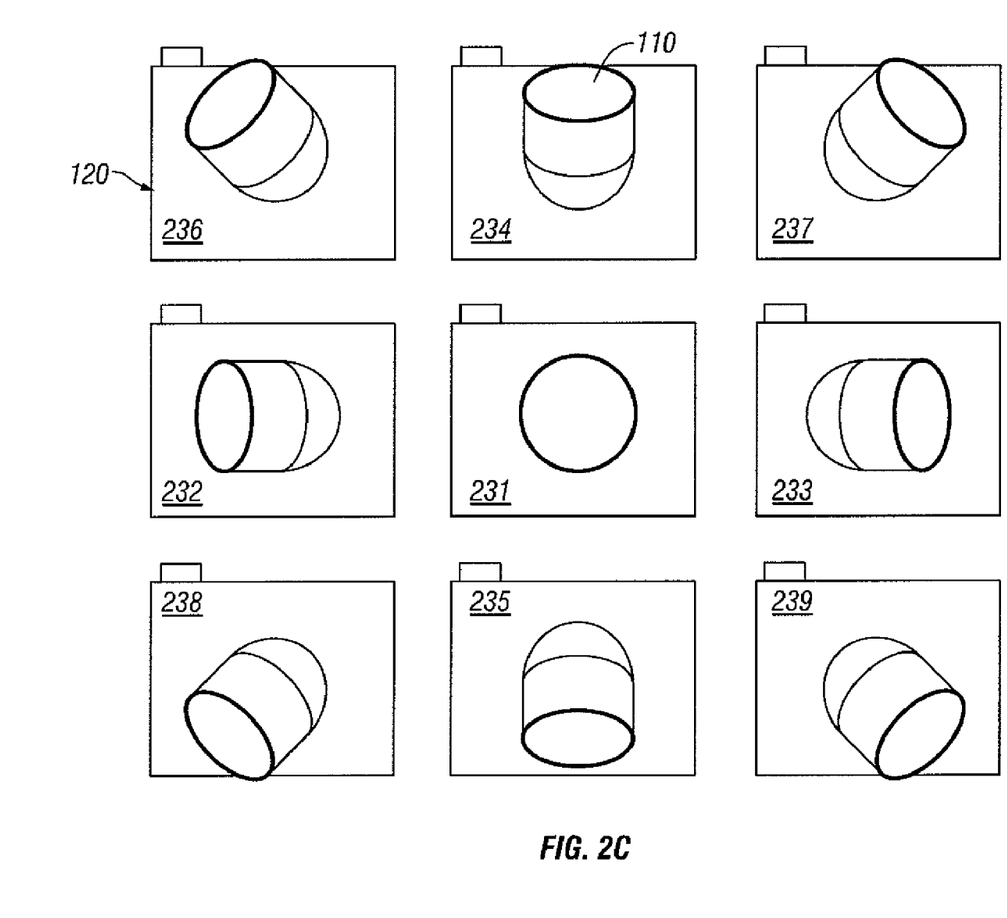
FIG. 2C is a front view diagram illustrating examples of both the auto-pan DOF and the auto tilt DOF in a handheld camera with a multiple-axis actuation mechanism.

FIG. 2A is a top view illustrating the auto-pan DOF 130 for a single-imager MAAM camera. The figure shows the actuated imager 110 panning left and right with respect to the camera body 120. FIG. 2B is a side view illustrating the auto-tilt DOF 140 for a single-imager MAAM camera. The figure shows the actuated imager 110 tilting up and down with respect to the camera body 120. FIG. 2C is a front view illustrating both the auto-pan DOF and the auto-tilt DOF for a single-imager MAAM camera. FIG. 2C includes nine views 231-239 showing the actuated imager 110 in various states with respect to the two degrees of freedom 130, 140. For example, the view 231 shows the actuated imager 110 pointing directly forward where neither the auto-pan DOF 130 nor the auto-tilt DOF 140 is used. The views 232 and 233 show the actuated imager 110 pointing left and right, respectively, where the auto-pan DOF 130, but not the auto-tilt DOF 140, is used. The views 234 and 235 show the actuated imager 110 pointing up and down, respectively, where the auto-tilt DOF 140, but not the auto-pan DOF 130, is used. The views 236, 237, 238, 239 show the actuated imager 110 pointing up and left, up and right, down and left, and down and right, respectively, where both the auto-pan DOF 130 and the auto-tilt DOF 140 are used. The actuated imager 110 may also have the auto-rotate DOF 150 which was described briefly above in reference to FIG. 1 and will be discussed in detail in reference to FIGS. 6A and 6B below.

The single-imager MAAM camera, such as that shown in FIGS. 2A and 2B may be used for an auto-centering purpose, e.g., centering an object of interest in the center of the captured image field. In other embodiments, the object of interest could be centered in a particular zone or placed at the intersection of particular zones of the captured image field. Assuming an object of interest is selected, the selected object may be centered automatically by a combination of the panning and the tilting motions of the actuated imager. The auto-center feature will be described in detail in reference to FIG. 4 below. The method and system for selecting an object of interest and centering the selected object automatically will be discussed in detail in reference to FIGS. 7 and 9 below.

Figure 3A:
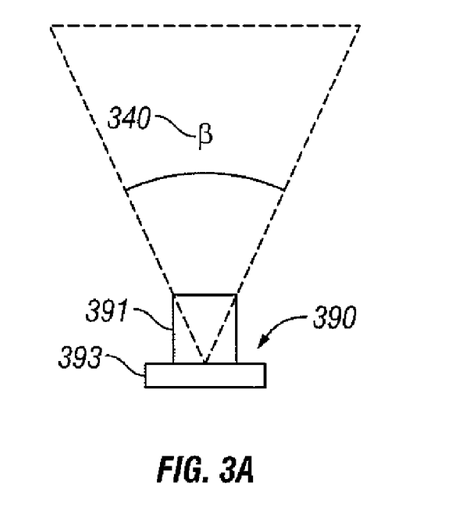
FIG. 3A is a diagram showing a conventional camera having a stationary imager with a standard field of view.
Figure 3B:
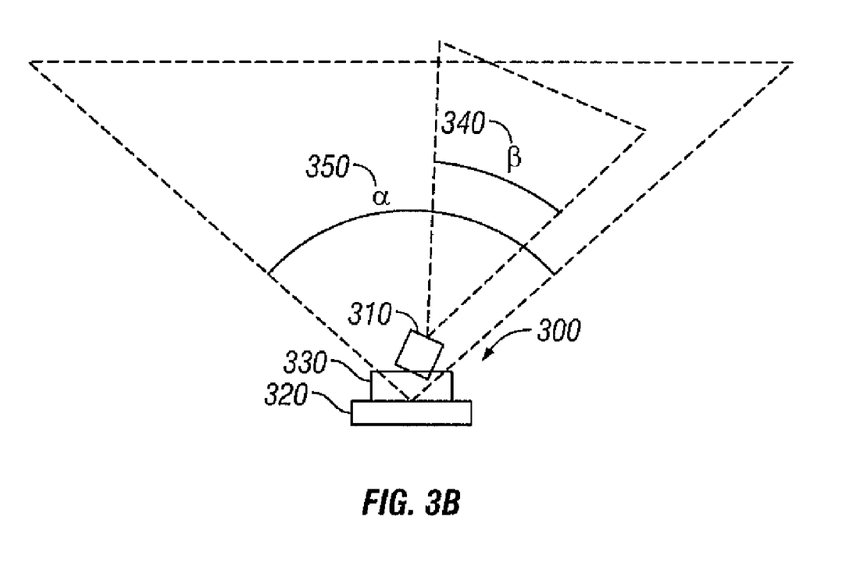
FIG. 3B is a diagram showing an example of a dual-imager MAAM camera having a stationary imager with a wide field of view and an actuated imager with a standard field of view.

FIG. 3A shows a conventional camera 390. The conventional camera 390 includes a camera body 393 and a conventional stationary imager 391. The conventional stationary imager has a standard field of view 340 (identified by an angle β); therefore, an image of an object lying outside the relatively narrow field of view β 340 will not be captured by the imager 391. FIG. 3B shows a dual-imager camera embodiment of a handheld camera with a multiple-axis actuating mechanism (hereinafter "dual-imager MAAM camera"). The dual-imager MAAM camera 300 includes a camera body 320, a stationary imager 330, and an actuated imager 310. The actuated imager 310, the source of the final captured image of the camera, has a standard field of view β 340. The stationary imager 330, which is used as an auxiliary overview imager, has a wide field of view 350 (identified by an angle α) that is wider than the standard field of view β 340 and also encompasses β. In some embodiments, the actuated imager 310 has at least one degree of freedom of motion, namely, either the auto-pan DOF 130 or the auto-tilt DOF 140 (FIG. 1). As compared to the conventional camera 390, the dual-imager MAAM camera 300 offers the advantage of having a wide field of view 350 which can be selectively scanned by the actuated imager 310 using the auto-pan DOF 130 and the auto-tilt DOF 140.

II. Automatic Image Capture System

Figure 9:
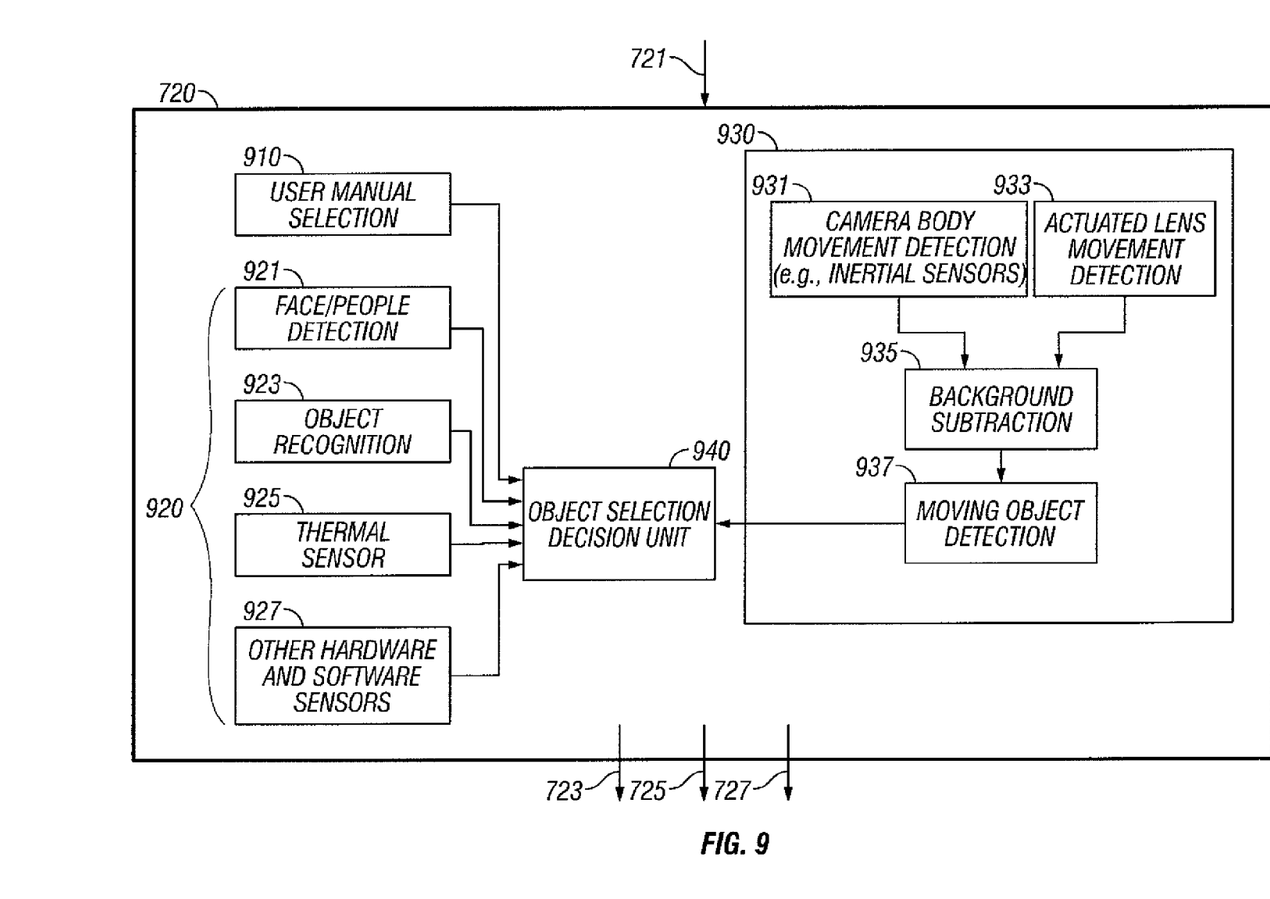
FIG. 9 a diagram illustrating the object selection module of the image capture system illustrated in FIG. 7.

It will be readily apparent to a person skilled in the technology that, as with the single-imager MAAM camera 100 (FIG. 1), the dual-imager MAAM camera 300 may also be used for an auto-centering purpose, e.g., centering an object of interest in the captured image field. In some embodiments, the actuating imager 310 of the dual-imager MAAM camera 300 may, in addition to having the auto-pan DOF 130 and the auto-tilt DOF 140, also have the auto-rotate DOF 150 (FIG. 1). In some embodiments, the dual-imager MAAM camera may also have an auto-zoom capability. Therefore, a dual-imager MAAM camera 300 may include three powerful compensation capabilities, namely, 1) auto-center capability, 2) auto-rotate capability, and 3) auto-zoom capability. These three compensation capabilities and an object selection capability, which will be discussed in detail with reference to FIG. 9, are used in embodiments of the automatic image capture system. In some embodiments, the single-imager MAAM camera 100 (FIG. 1) may also include some or all of these capabilities, while in some embodiments, the dual-imager MAAM camera may not have all three capabilities, e.g., the auto-center and auto-zoom capabilities, but not the auto-rotate capability.

(a) Auto-Center

Figure 4:
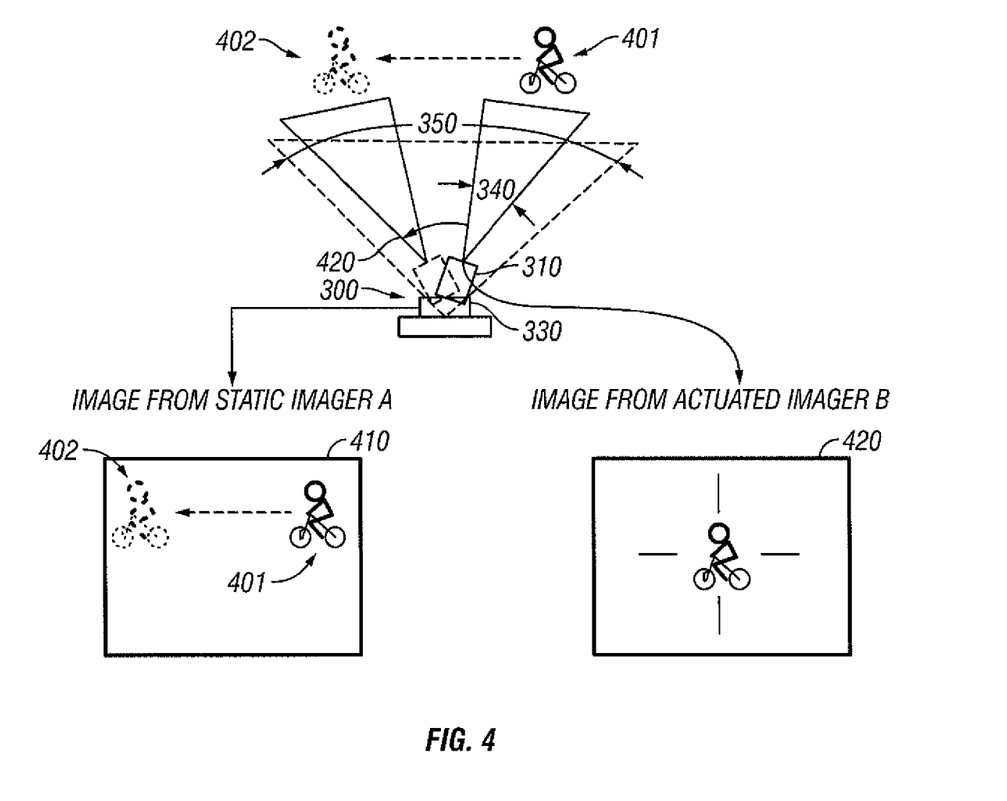
FIG. 4 is a diagram illustrating an example of an auto-center feature of an automatic image capture system.

FIG. 4 illustrates the auto-center capability according to some embodiments of the automatic image capture system. Here, the auto-center capability will be described in reference to a dual-imager MAAM camera 300 (FIG. 3B). However, it will be understood that the auto-center capability may be implemented also with a single-imager MAAM camera 100 such as shown in FIGS. 1, 2A, 2B, and 2C. During an auto-center process, an object of interest 401, such as a bicyclist in the illustration, may be moving or stationary. Here, for the purpose of illustration of the auto-center capability, the object of interest 401 is assumed to be moving along the horizontal direction as shown in FIG. 4. As discussed above in reference to FIG. 3B, the dual-imager MAAM camera 300 includes the stationary imager 330 and the actuated imager 310. In addition, the stationary imager 330 has the wide field of view α 350 while the actuated imager has the standard field of view β 340 that is narrower than α.

Initially, the bicyclist 401, being located inside the wide field of view a 350, is selected as the object of interest to be centered. This selection of an object of interest is performed by an object selection module which will be described in detail in reference to FIG. 9 below. The bicyclist 401 appears in the upper right portion of an image field 410 of the static imager 330 (FIG. 3B) which is defined by the wide field of view a 350. Subsequently, the stationary imager 330 continues to track the bicyclist to a later position 402 at a later time using a software algorithm. Such software-based tracking may be achieved by optic flow or other vision algorithms (e.g., O'Sullivan, Igoe, Physical Computing: Sensing and Controlling the Physical World with Computers, Chapter 9, Thomson Course Tech., 2004). The SwisTrack tool (see, e.g., SwisTrack: A Tracking Tool for Multi-Unit Robotic and Biological Systems, by Correll, Nikolaus; Sempo, Gregory; Lopez de Meneses, Yuri; Halloy, Jose; Deneubourg, Jean-Louis; Martinoli, Alcherio, in 2006 IEEE/RSJ International Conference on Intelligent Robots and Systems (2006), p. 2185-2191, 2006) can be used for trajectory tracking of multiple moving objects, with its core image manipulation functions provided by Intel Corporation's Open Source Computer Vision Library ("OpenCV Library"), for example. A visual tracking or video tracking system can also be used, which includes algorithms such as, but not limited to: blob tracking, kernel-based tracking, contour tracking, Kalman filters, and particle filters. Based on the image provided by the stationary imager 330, the object selection module calculates the object location information regarding the center coordinate of the bicyclist in its image field 410. Meanwhile, the actuated imager 310, based on object location information, initially moves the lens using one or both of the auto-pan DOF and the auto-tilt DOF so as to bring the image of the bicyclist to the center of its image field 420, which is defined by the standard field of view β 340. Subsequently, the actuated imager 310 continues to move the lens to physically track the moving object, based on the object location information, so that the bicyclist at the later position and time 402 remains centered within the image field 420 of the actuated imager. In case the object of interest 401 remains stationary, the actuated imager 310 will initially move the lens so as to center the object of interest in its image field 420 based on the object location. However, after the initial centering is complete, no further tracking by the actuated imager will be necessary unless the object or the handheld camera moves with respect to the background.

In another embodiment, the object of interest could be centered in a selected zone or area of the image field such that the object is not centered in the entire image field. In yet another embodiment, the image field can be divided into three vertical areas and/or three horizontal areas, and the object of interest can be placed at the intersection of the boundaries between the areas to be considered as auto-centered. Yet other embodiments of automatic placement in the image field are contemplated.

(b) Auto-Zoom

Figure 5:
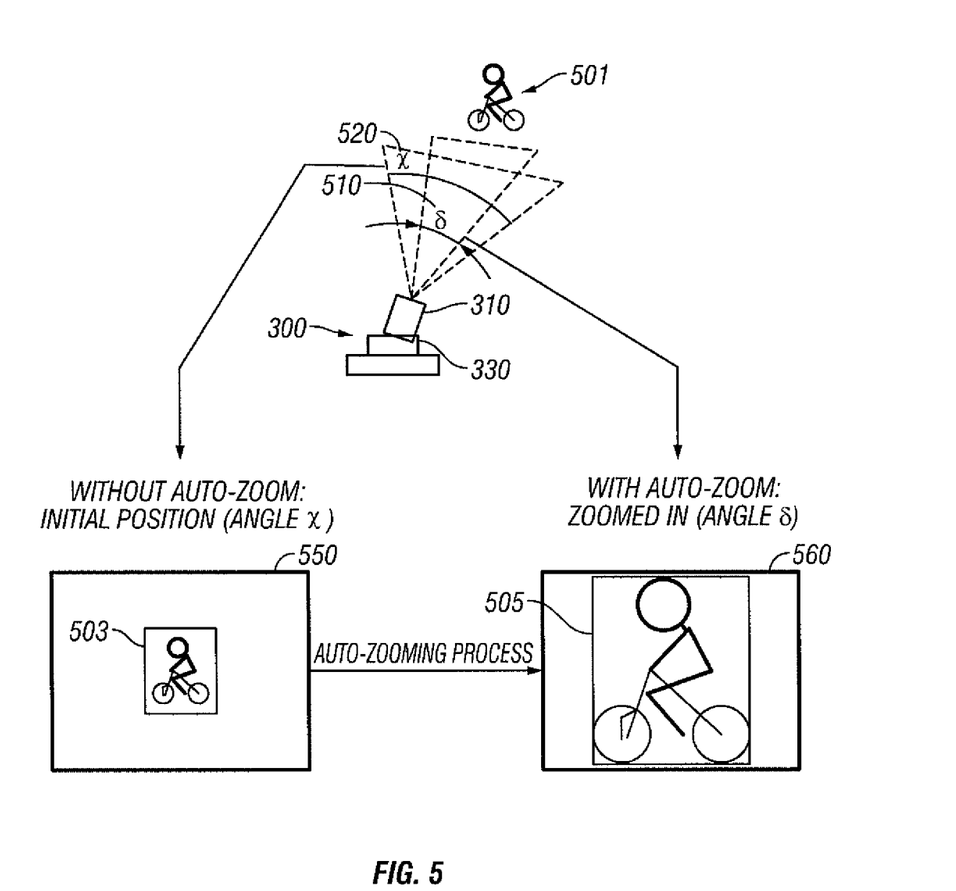
FIG. 5 is a diagram illustrating an example of an auto-zoom feature of an automatic image capture system.

FIG. 5 illustrates the auto-zoom capability according to some embodiments of the automatic image capture system. Here, the auto-zoom capability will be described in reference to a dual-imager MAAM camera 300 (FIG. 3B). However, it will be understood that the auto-zoom capability may be implemented also with a single-imager MAAM camera 100 such as shown in FIGS. 1, 2A, 2B, and 2C. An object of interest 501, such as a bicyclist in the illustration, may be moving or stationary. For the purpose of illustration of the auto-zoom capability, the object of interest is assumed to be stationary. This is because even if the object is moving in an absolute sense with respect to the background, the object remains stationary in a relative sense within an image field 550 and 560 of the actuated imager 310 due to the auto-center process as discussed above in reference to FIG. 4. As previously described, the dual-imager MAAM camera 300 includes the stationary imager 330 and the actuated imager 310. Here, the actuated imager 330, in addition to having the pan DOF and the tilt DOF, has the auto-zoom capability, in which case, the actuated imager 330 may have a different lens or view angle depending on the status of the auto-zoom. For example, a wide view angle 520, identified by an angle χ, represents the initial view angle, before the auto-zoom takes place, while a narrow view angle 510, identified by an angle δ, represents the zoomed-in view angle.

As an example, without the auto-zoom, an object of interest 503 is covered by the wide view angle χ 520, and, consequently, the object (bicyclist) 503 only fills a fraction of an imager field 550. Under an auto-zoom process, a vision system assesses the overall size of the object of interest 503 without the auto-zoom. Based on the object size information, the auto-zoom module (not shown) automatically zooms the lens until the bicyclist in an auto-zoomed state 505 is covered by the narrower zoomed-in view angle δ 510 and fills a large portion of the imager field 560. The object size information is also normally provided by the object selection module which will be discussed below in reference to FIG. 9.

(c) Auto-Rotate

Figure 6A:
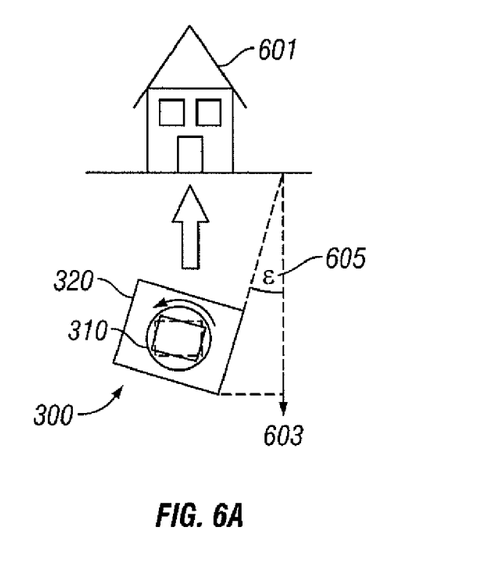
FIG. 6A is a diagram illustrating an example of a problem of a rotated image.
Figure 6B:
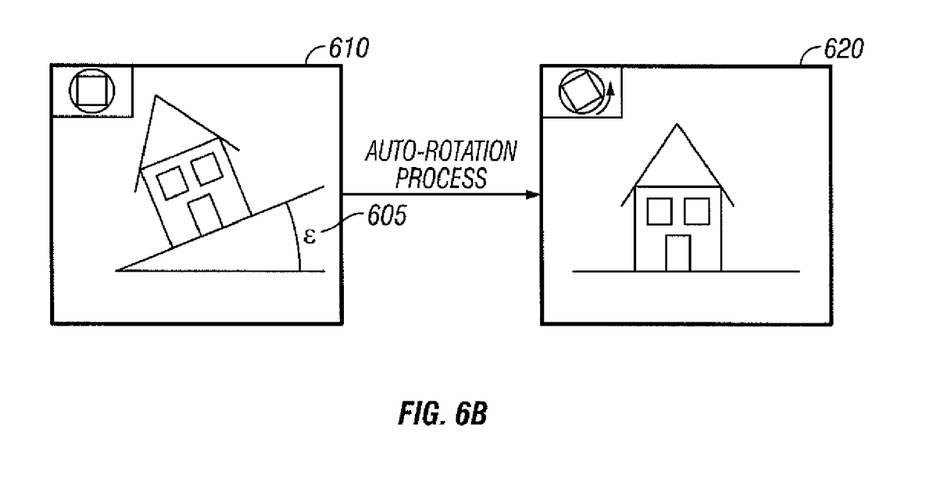
FIG. 6B is a diagram illustrating an example of an auto-rotate feature of the automatic image capture system.

FIGS. 6A and 6B illustrate a horizontal alignment function of the auto-rotate capability according to some embodiments of the automatic image capture system. FIG. 6A shows an object of interest, such as a house 601, and a dual-imager MAAM camera 300 (FIG. 3B) where the image of the house 601 is taken while the camera body 320 is rotated by an angle ε 605 with respect to the direction of gravity 603. Again, as with the auto-center and the auto-zoom features, the auto-rotate feature may be implemented either with a single-imager MAAM camera 100 (FIGS. 1, 2A, 2B and 2C) or with a dual-imager MAAM camera 300 (FIG. 3B). In the following discussions, it is helpful to make a distinction between a temporary captured image and a final captured image. A temporary captured image is an image captured by a MAAM camera before the camera optimizes the image by adjusting one or more degrees of freedom (DOF) of the actuated imager. A final captured image, on the other hand, is an image captured by a MAAM camera that is actually stored in the camera after the camera has performed all the optimizations by adjusting one or more degrees of freedom of the actuated imager. As an example, an image field 610 of FIG. 6B shows a temporary captured image of the house without use of the auto-rotate feature. The house appears rotated by the angle ε 605 counter-clockwise with respect to a horizontal line parallel to the bottom edge of the image. Under an auto-rotation process, the actuated lens 310 is rotated by the angle ε 605 in the same direction (counter-clockwise). After the auto-rotate process, the house object is level with the bottom horizontal edge of the final captured image 620 shown in FIG. 6B.

In certain embodiments, the rotation angle ε 605 may be determined in one of two ways. The first way is through measuring the amount of tilt of the camera body 320 with respect to the direction of gravity 603 by use of a gravity sensor such as an inclinometer (not shown). In one embodiment, the inclinometer can be a model SQ-SI2X-360DA 360°×180° dual axis MEMS inclinometer available from Signalquest. The second way is through the use of a dominant visual edge method. For example, all edges of various objects in the temporary captured image are identified and processed to determine the dominant edge which is assumed to be true vertical or true horizontal. Detection of the dominant visual edge can be accomplished through generic edge detection that is fed into an edge classification algorithm using, for example, the OpenCV Library. Alternately, the Canny edge detection algorithm can be used (see, e.g., IEEE, Trans. Pattern Analysis and Machine Intelligence, Vol. PAMI-8, pp. 679-714, 1986).

Figure 6C:
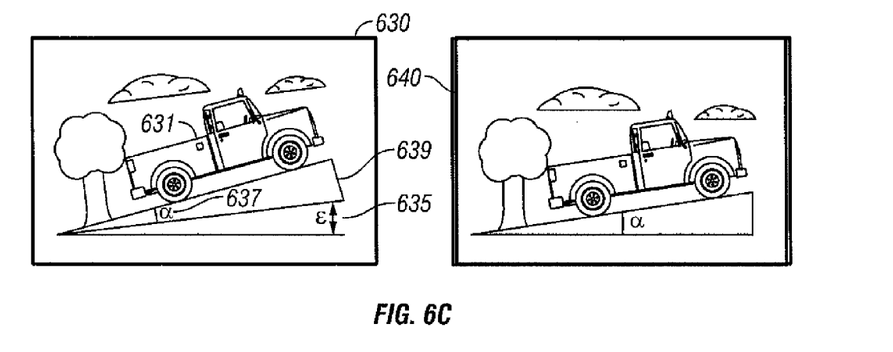
FIG. 6C is a diagram illustrating an example of an auto-rotate feature of the automatic image capture system.

In certain embodiments, both the first way (gravity sensor) and the second way (dominant visual edge method) can be implemented. This allows the user to choose one of two output images in cases where the object of interest is not perpendicular to gravity, for example, a car driving up a hill as shown in FIG. 6C. A temporary captured image 630 shows a car 631 driving up a hill 639 having an angle of incline of a 637. In addition, the entire temporary captured image is rotated by an angle ε 635 with respect to the direction of gravity due to the fact that the camera body is rotated by the same angle. In such a case, the gravity-detection-based auto-rotate process produces a final captured image 640 in which the car is at angle α 637 to the edges of the image field. In contrast, the dominant visual edge method would produce a different final captured image (not shown) in which the car is aligned with the edges of the image field.

Another function of the auto-rotate feature is to automatically select between the portrait mode versus the landscape mode based on the shape of the selected object. For example, if the horizontal length (width) of the selected object is much larger than the vertical length (height) of the object, e.g., an ocean liner, it may be more proper to take the picture in the landscape mode than in the portrait mode. The auto-rotate capability allows the MAAM camera to automatically select between the portrait mode and the landscape mode based on the object shape information, which indicates, for example, whether the shape of the object is dominant in one direction.

The object shape information is also normally provided by the object selection module which will be discussed below in reference to FIG. 9.

(d) Automatic Image Capture System

Figure 7:
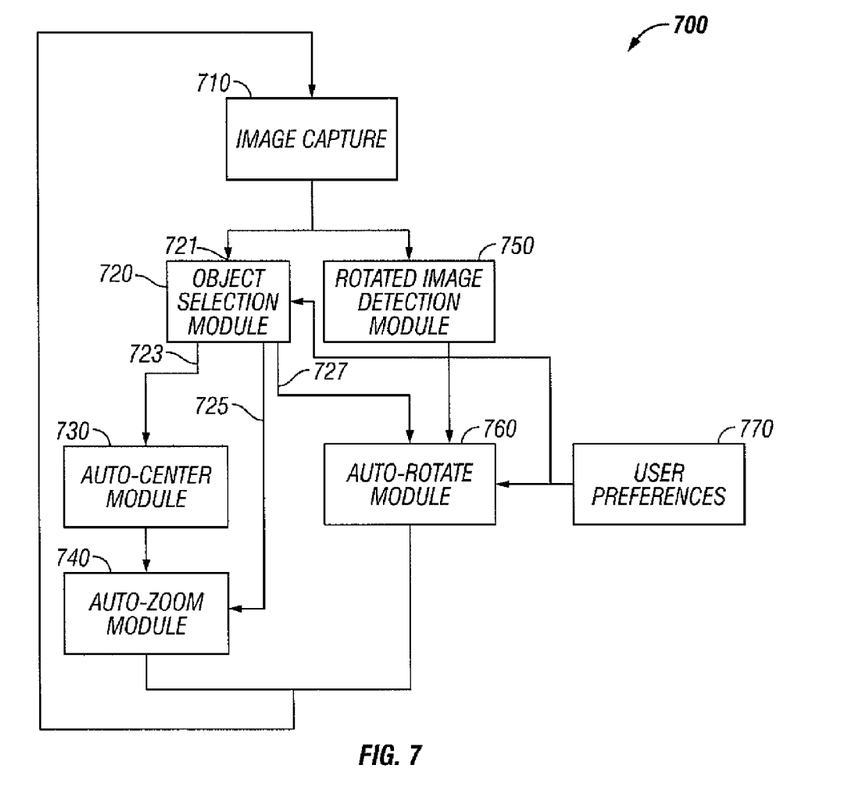
FIG. 7 is a block diagram illustrating automatic image capture in an imager with a multiple-axis actuating mechanism.

FIG. 7 is a diagram of a control process 700 of some embodiments of the automatic image capture system. The process 700 can be performed by a computer, processor, controller or other type of computing device that is part of the handheld camera. The process 700 starts when a temporary captured image is obtained at state 710. In an embodiment with the single-imager MAAM camera 100, the temporary captured image comes from the actuated imager 110. In an embodiment with the dual-imager MAAM camera, the temporary captured image may come from either the actuator imager 310 or the stationary imager 330 or both. In certain embodiments, the automatic image capture system includes two functional branches: an auto-center/auto-zoom branch and an auto-rotate branch. The auto-center/auto-zoom branch includes two compensation modules: an auto-center module 730 and an auto-zoom module 740. The auto-rotate branch includes a rotated image detection module 750 and an auto-rotate module 760. The three compensation modules—the auto-center module 730, the auto-zoom module 740, and the auto-rotate module 760—take inputs from the object selection module 720. The object selection module 720 receives the temporary captured image data as its input 721 and, in conjunction with various sensor inputs (not shown), selects the object(s) of interest and outputs object location information 723 and, in some embodiments, also object size information 725 and object shape information 727. The object selection module 720 will be discussed in detail below in reference to FIG. 9.

In the auto-center/auto-zoom branch, the auto-center module 730 receives the object location information 723 from the object selection module 720. Based on the object location information, the auto-center module 730 causes the actuated imager to either pan or tilt or both so as to bring the selected object to the center of the imager field of the actuated imager as described above in Section II(a) in reference to FIG. 4 and sends the centered image to the auto-zoom module 740. Next, the auto-zoom module 740 receives the centered image from auto-center module 730 and also the object size information 725 from the object selection module 720 and performs the auto-zoom process as described above in Section II(b) in reference to FIG. 5. After performing the auto-center and the auto-zoom processes in the auto-center/auto-zoom branch, the image of the selected object is now centered in and fills up a large portion of the image field or image area.

In the auto-rotate branch, the rotated image detection module 750 receives the temporary captured image data as input and determines the angle $\epsilon$ 605 by which the image contents are rotated away from a true horizontal or vertical alignment with the edges of the image field (FIGS. 6A and 6B). This determination is made either by use of a gravity sensor or by use of the dominant visual edge method, as described above in Section II(c). The auto-rotate module 760 receives the rotational angle information $\epsilon$ from the rotated image detection module 750 and rotates the imager by the angle $\epsilon$. If the object of interest 601 is located on a hill or other surface such that the direction of gravity 603 is not perpendicular or parallel to the dominant visual edge as it is in FIG. 6A, the gravity sensor can be overridden by the dominant visual edge method, either by policy or if the user manually so chooses. Examples include images taken of a tall building from a ground perspective, aiming at the corner of the building: due to the effects of perspective, the corner of the tall building may appear tilted even though the imager is aligned to gravity. In such cases, the dominant visual edge method is preferred over the gravity sensor method, making all lines which are vertical in reality (e.g., the corner of a building) also vertical in the image. The auto-rotate process includes the rotation angle determination as described in detail above in Section II(c) in reference to FIGS. 6A and 6B. In some alternative embodiments, the auto-rotate module 760 may also receive object shape information 727 from the object selection module 720 whereby the auto-rotate module 760 may automatically select either the portrait mode or the landscape mode depending on the object shape information.

It should be noted that the control process 700 describes only one of many possible embodiments. For example, in alternative embodiments, the execution of modules may be in different order, either sequential or parallel, or a combination of both. When modules are executed in parallel, the modules may communicate asynchronously by sending messages to each other. In yet other alternative embodiments, some of the functional modules including the object selection module 720 and the auto-rotate module 760 may be subjected to control by selectable user preferences 770. In certain embodiments, the user preferences include: 1) enabling or disabling a particular module; 2) selecting a manual selection option in the object selection module; and/or 3) aligning to either gravity, horizon, or to dominant vertical in the auto-rotate module. In a video camera setting, image capture can be continuous. User input may start and stop the continuous capture. In a photo camera setting, the image capture is user triggered, and may happen at any time. In both cases, the image capture is asynchronous from other modules, which are working continuously and independently from user input and are always ready to provide information. In yet other alternative embodiments, the automatic image capture system may also include an auto-focus capability.

The above-described processes can be realized in a program format to be stored on a computer readable recording medium that includes any kinds of recording devices for storing computer readable data, for example, a CD-ROM, a DVD, a magnetic tape, a memory card, and a disk, and may also be realized in a carrier wave format (e.g., Internet transmission, and/or Bluetooth transmission).

Figure 8A:
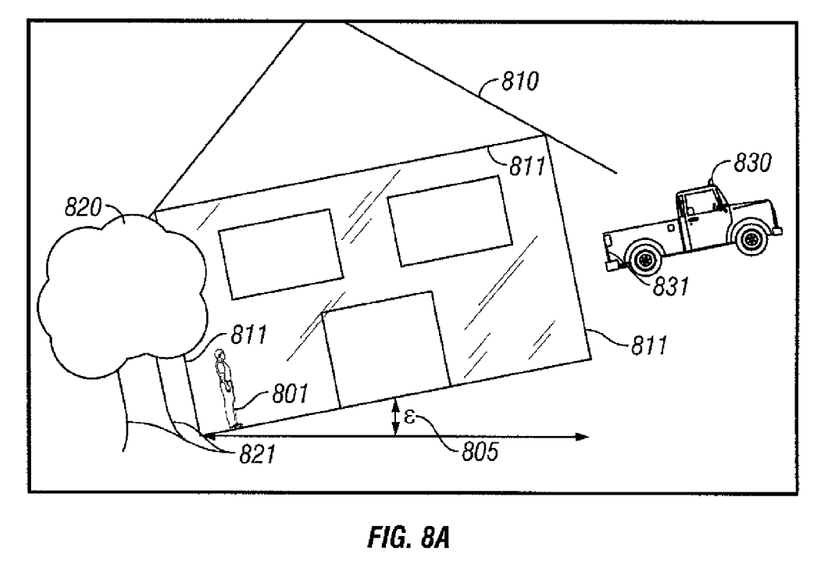
FIGS. 8A and 8B are diagrams illustrating an example of a temporary captured image (FIG. 8A) and a final captured image (FIG. 5B) showing an operation of the automatic image capture system.
Figure 8B:
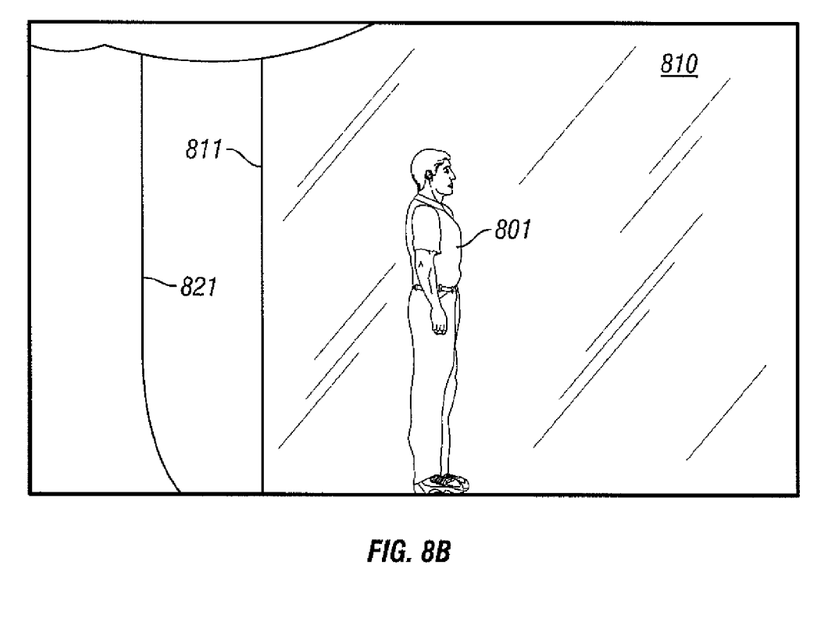

FIG. 8A and FIG. 8B are examples of a temporary captured image and a final captured image, respectively, for illustrating the operation of the automatic image capture system. All referenced functional modules 720, 730, 740, 750, 760 and 770 are shown in FIG. 7. In this example, the object selection module 720 takes the temporary captured image and makes a determination that a man 801 is the object of interest. The object selection module 720 passes the object location information 723 specifying the coordinates of the man 801 in the image field to the auto-center module 730. Based on the object location information 723, the auto-center module 730 causes the actuated imager 310 (FIG. 3B) to pan the actuator imager left until the man is centered in the imager field. The auto-zoom module 740 receives the centered image from the auto-center module 730 and the object size information 725 from the object selection module 720. Based on these two sets of information, the auto-zoom module 740 performs an auto-zoom process until the image of the man occupies a larger part of the image area or field. The degree to which the object fills the image area may be one of the settable user preferences 770. Meanwhile, the rotated image detection module 750 also receives the temporary captured image and determines that the image is rotated by a rotation angle $\epsilon$ 805 (FIG. 8A). This determination is made by either reading the output of an inclinometer or by considering edges, 811, 821, and/or 831: the edge 811 associated with a building 810, the edge 821 associated with a tree 820 and/or the edge 831 associated with a vehicle 830 of various objects in the temporary captured image. The auto-rotate module 760 receives the rotation angle information from the rotated image detection module 750 and rotates the actuated imager by the rotation angle $\epsilon$ so as to make the final captured image shown in FIG. 8B align with the horizontal or gravity.

III. Automatic Object Selection

FIG. 9 shows a block diagram for an embodiment of the object selection module 720 shown in FIG. 7. The object selection module 720 includes a user manual selection unit 910, various object feature sensors 920, an object movement detection module 930, and an object selection decision unit 940. The object feature sensors 920 are configured to sense certain features of objects presented to the camera's field of view, and in certain embodiments, include a face/people detection sensor 921, an object recognition sensor 923, a thermal sensor 925, and other hardware and software sensors 927 configured for such purpose. It will be apparent to a person skilled in the technology that one or more of the object feature sensors may be implemented as either hardware or software or firmware (software contained in a read-only memory (ROM) device). For example, the object recognition sensor 923 may be based on a pure software program operating on the captured data of a temporary image or, alternatively, on one or more electronic sensors that are designed to detect certain objects such as a light source or an animal and a software program operating on the sensed information. The same is true for other object feature sensors 921, 925, 927. The object movement detection module 930 is configured to sense truly moving objects among objects presented to the camera's field of view. In certain embodiments, truly moving objects are those objects that are still moving after subtracting any camera body and lens movement. The module 930 includes a camera body movement detection unit 931, an actuated lens movement detection unit 933, a background subtraction unit 935, and a moving object detection unit 937. In some embodiments, the camera body movement detection unit 931 is based on an inertial sensor such as a MEMS-based accelerometer available from Analog Devices (Norwood, Mass.), for example. In embodiments utilizing a servo to actuate the lens, the actuated lens movement detection unit 933 keeps track of the recent servo controller's commands to determine the location of the servo. If the actuated lens movement detection unit 933 needs a faster detection time or higher precision for the servo position than commercially available micro servos can provide natively, an additional rotary encoder with higher precision can be installed in the servo mechanism. The object selection decision unit 940 receives inputs from the various object feature sensors 921, 923, 925, 927 and the object movement detection module 930 and the user manual selection unit 910, and ultimately makes the object selection decisions.

In operation of certain embodiments, the object selection module 720 receives a captured image from an imager at its captured image input 721. The received captured image data is made available to the object movement detection module 930 and one or more of the object feature sensors 920. The object movement detection module 930 senses the movement of the camera body itself from the camera body movement detection unit 931, such as based on accelerometer data, and also senses the movement (e.g., panning, tilting, rotation, zooming) of the actuated lens from the actuated lens movement detection unit 933, such as based on encoder data of the servo-controlled actuator. The background subtraction unit 935 calculates the motions, if any, of various object(s) by analyzing a series of captured images. However, the calculated motions of the object(s) may be attributable to the motion of the camera body itself or to the motion of the actuated lens. The background subtraction unit 935 tags all regions of a picture that are considered non-moving by compensating for possible background motions. The background subtraction unit 935 subtracts the background motions determined from the motion sensors 931 and 933 from the calculated motions of the object(s) to produce the background compensated image data. The moving object detection unit 937 receives the background compensated image data and determines what object or objects, if any, are truly moving objects by running canonical moving object tracking algorithms. These algorithms can be part of the visual tracking or video tracking system previously discussed. The moving object detection unit 937 passes on to the object selection decision unit 940 the relative size in pixels, the object location, and other information about the moving object(s) that can be built into the detection capabilities, such as object shape and trajectory.

As mentioned above, the object feature sensors 920 are configured to sense certain features of objects presented to the camera's field of view. The thermal sensor 925, for example, can measure temperature profiles of various objects. The temperature profiles may be used for identifying or helping to identify an animate object (a runner) from an inanimate background (road) for example. Examples of thermal sensors include, but are not limited to, a MIM500H uncooled microbolometer available from BAE Systems, a Land Guide M4 thermal imager from Land Instruments, and an uncooled infrared LW detector from Ulis. The face/people detection sensor can be configured to identify faces or human beings. In certain embodiments, the face/people detection sensor 921 may be software implemented to analyze the captured image data and pick out objects that match templates representing faces or human beings. The OpenCV Library can be utilized as a database for these templates, for example. In certain embodiments, the object recognition sensor 923 can be a more general pattern recognition module that is configured to recognize various objects, e.g., a dog and a cat, whose representative templates are stored in the module. The object recognition sensor 923 can utilize 2D object recognition software (see, e.g., Amit, 2D Object Detection and Recognition Models, Algorithms, and Networks, MIT Press, 2002), which can be accomplished using the OpenCV Library as a tool. An object can also be recognized by its sound by utilizing a stereo microphone or microphone array in conjunction with digital audio signal processing software. Object recognition can also occur with a RFID reader that detects an object based on its tag. In certain embodiments, other hardware & software sensors 927 can include, but are not limited to: magnetic and inductive sensing, non-visible light sensors (e.g., infrared and ultraviolet sensors), multi-spectral sensors, radar and lidar-based sensing, distance-based sensing (e.g., Z-Sense from 3DV Systems, located in Yokne'am, Israel), eye gaze detection (e.g., eyebox2 from Xuuk Inc., located in Kingston, Canada), and smell-based sensing. The object feature sensors 920 pass on to the object selection decision unit 940 the relative size in pixels, the object location, and other information about the moving object(s) that can be built into the detection capabilities, such as object shape and trajectory.

The object selection decision unit 940 receives the outputs of the object feature sensors 920 and the object movement detection module 930 and selects one or more objects of interest among all the objects contained in the captured image. In some embodiments, the selection decision is based on the analysis of the captured image and the various sensor inputs. For example, suppose that the face/people detection sensor 921 identifies two potential candidate objects as matching the template representing human beings. As it turns out, however, one of the candidate objects is not a live person but a statue that the other candidate object, a live person, happens to stand by. With the help of the thermal sensor 925, however, the object selection decision unit 940 may determine which of the two candidate objects is a live person and which is not. The factors that the object selection decision unit 940 can consider in making the selection include, but are not limited to: 1) size of the object, 2) movement of the object, and 3) animation of the object (whether the object is animate or inanimate). The section decision may also be partly dependent on the priorities passed from the user manual selection unit 910 to the object selection decision unit 940. The user manual selection unit 910 can require, for example, that automobile objects take priority over human being objects, or that the fastest moving object be selected as the object of interest. As another example, the user manual selection unit 910 can include an option for the user to manually select an object, such as by touching the object on a touch screen with a graphical user interface (GUI). Information about manually selected objects is passed on to the object selection decision unit 940, such as the relative size in pixels, the object location, and other information about the moving object(s) that can be built into the detection capabilities, such as object shape and trajectory.

In some embodiments, the object selection decision unit can use a decision structure based on several conditions in which the highest priority condition that applies controls the object selection decision. The various conditions can be arranged in any order in the object selection decision unit 940, and the selection decision can depend on the user manual selection unit 910 to determine the order of some or all of the conditions. In some embodiments, if the user has input priorities to the user manual selection unit 910, these priorities apply first. For example, if the captured image contains both a person and a car and the user has selected that automobile objects should take priority over human being objects, the user selection unit 910 causes the object selection decision unit 940 to select the car as the object of interest. If the captured image contains several race cars and the user has elected that the fastest moving object be selected, the object selection decision unit 940 selects the fastest race car as the object of interest. If no user priorities apply, the object selection decision unit 940 can select the largest moving object in the image. If there are two moving objects of the same size, the fastest moving object in the image, determined by the moving object detection unit 937, can be selected. Next, a face or human being can be selected based on face/people detection sensor 921 output, or the largest face or human being if there are more than one. Another condition can be to select the animate object in the image based on the object recognition sensor 923 with software capable of recognizing people or animals, or the largest animate object if there is more than one. Thermal sensor 925 output can be utilized by the object selection decision unit 940 to select the warmest object, or the largest warm object. Other conditions can include those features detected by other hardware and software sensors 927, such as the object that looks at the camera, determined by the eye gaze detector, or the nearest moving object, determined by the depth sensor.

Once the selection decision is made, the object selection module 720 finally provides various outputs to other functional modules of the MAAM camera as discussed above in reference to FIG. 7. In certain embodiments, the outputs of the object selection module 720 may include: 1) object location information 723, 2) object size information 725, and 3) object shape information 727. For example, the object location information 723 can be used by the auto-center module 730 to center the object of interest in the imager area. The object size information 725 can be used by the auto-zoom module 740 to centrally fill up the imager area with the selected object. The object shape information 727 can be used by the auto-rotate module 760 to automatically select either the portrait mode or the landscape mode.

CONCLUSION

While specific blocks, sections, devices, functions and modules may have been set forth above, a skilled technologist will realize that there are many ways to partition the system, and that there are many parts, components, modules or functions that may be substituted for those listed above.

While the above detailed description has shown, described, and pointed out the fundamental novel features of the invention as applied to various embodiments, it will be understood that various omissions and substitutions and changes in the form and details of the system illustrated may be made by those skilled in the art, without departing from the intent of the invention.

What is claimed is:

1. A system for automatically selecting an object from a field of view of an image capture device, the system comprising:
   a plurality of sensors configured to sense features of objects in the field of view;
   a decision unit configured to automatically select one or more objects of interest based on the sensed features using a decision algorithm that is based on a decision structure, wherein the decision structure receives and prioritizes inputs from the plurality of sensors; and
   an object movement detection module configured to sense the movement of the body of the handheld image capture device and having a background subtraction unit configured to
      analyze a series of captured images to calculate the motion of one or more object images relative to the frame of the captured images;
      subtract background motion vectors using camera body movement data; and
      produce background compensated image data,
   wherein a captured image is received from the image capture device.

2. The system of claim 1, wherein the decision unit is configured to receive information from the sensors and the object movement module so as to automatically select one or more objects from the field of view.

3. The system of claim 2, wherein the information comprises at least one of: size, location, shape, and trajectory of the one or more objects.

4. The system of claim 2, wherein the decision unit selects one or more objects based on an analysis based on one or more of an object size sensing, an object movement sensing, object thermal sensing, and object recognition sensing.

5. The system of claim 2, wherein the decision unit selects one or more objects based on priorities from a manual selection unit.

6. The system of claim 2, wherein the decision unit selects one or more objects based on one or more conditions arranged in a hierarchy.

7. The system of claim 1, wherein the object movement detection module is further configured to:
   sense the movement of an actuated lens of the handheld image capture device;

calculate the motions of one or more objects by analyzing a series of captured images;

subtract background motion vector using actuated lens movement data; and produce background compensated image data.

8. The system of claim 7, wherein the object movement detection module further comprises a moving object detection unit that determines moving objects based on the background compensated image data.

9. The system of claim 1, wherein the system outputs information about the one or more selected objects.

10. The system of claim 9, wherein the output information is at least one of: object image size information, object shape information, and object image location information.

11. The system of claim 1, wherein the sensors include a face or human being detection sensor.

12. The system of claim 1, wherein the sensors include an object recognition sensor configured to recognize various objects whose representative templates are stored in a storage associated with the sensor.

13. The system of claim 1, wherein the sensors include at least one of: thermal, magnetic, inductive, non-visible light, multi-spectral, radar, lidar, eye gaze detection, depth, acoustic, and smell sensors.

14. The system of claim 1, wherein the object movement detection module further comprises a moving object detection unit that determines moving objects based on the background compensated image data.

15. A computer-implemented method of automatically selecting an object of interest from a field of view of an image capture device, the method comprising:

receiving a captured image as input;

sensing features of a plurality of objects in the captured image using a plurality of sensors;

detecting movement of one or more objects in the captured image wherein said detecting comprises detecting camera body movement;

detecting actuated lens movement;

calculating motions of one or more objects by analyzing a series of captured images;

subtracting background motions based on the camera body movement and the actuated lens movement; and identifying one or more moving objects; and automatically selecting one or more objects of interest based on the sensed features using a decision algorithm that is based on a decision structure, wherein the decision structure receives and prioritizes inputs from the plurality of sensors.

16. The method of claim 15, wherein at least one of the sensors is configured to sense a feature other than human face features or human beings.

17. The method of claim 15, wherein the automatically selecting one or more objects of interest comprises analyzing data based on at least one of: object size sensing, object thermal sensing, and object recognition sensing.

18. The method of claim 15, wherein the automatically selecting one or more objects of interest comprises analyzing object movement.

19. A system for automatically selecting an object from a field of view of a handheld image capture device, the system comprising:

a plurality of sensors configured to sense features of objects in the field of view;

an object movement detection module configured to detect movement of objects in the field of view by detecting camera body movement, detecting actuated lens movement, calculating the motions of objects, subtracting the camera body movement and actuated lens movement from the motions of objects, and determining what objects are moving objects; a manual selection unit configures to provide user priorities; and a decision unit configured to receive information from the plurality of sensors, the object movement module and the manual selection unit and to automatically select one or more objects of interest based on object size, object movement, object temperature and the priorities.

20. The system of claim 19, additionally comprising a mechanism for outputting object image size, object image movement, and object image location information.

21. A non-transitory computer usable medium having computer readable program code embodied therein for automatically selecting an object of interest from a field of view of an image capture device, the computer readable code comprising instructions for:

receiving an image of the field of view from the image capture device;

sensing features of one or more objects in the image;

detecting movement of the one or more objects in the image wherein said detecting comprises detecting camera body movement;

detecting actuated lens movement;

calculating motions of one or more objects by analyzing a series of captured images;

subtracting background motions based on the camera body movement and the actuated lens movement; and identifying one or more moving objects;

automatically selecting one or more objects of interest based on the sensed features and the detected movement; and outputting information about the selected one or more objects.

* * * * *